(12) United States Patent
Tsukamoto et al.

(10) Patent No.: US 6,483,072 B2
(45) Date of Patent: Nov. 19, 2002

(54) LASER WELDING METHOD

(75) Inventors: Susumu Tsukamoto, Ibaraki (JP); Isao Kawaguchi, Ibaraki (JP); Goro Arkane, Ibaraki (JP)

(73) Assignees: Japan as Represented by Director General of Ministry of Education, Culture, Sports, Science and Technology National Research Institute for Metals, Ibaraki (JP); Ishikawajima-Harima Heavy Industries, Co., Ltd., Tokyo (JP)

( * ) Notice: Subject to any disclaimer, the term of this patent is extended or adjusted under 35 U.S.C. 154(b) by 44 days.

(21) Appl. No.: 09/802,850

(22) Filed: Mar. 12, 2001

(65) Prior Publication Data

US 2002/0014476 A1 Feb. 7, 2002

(51) Int. Cl.[7] ................................................ B23K 26/20
(52) U.S. Cl. .................................................. 219/121.64
(58) Field of Search ......................... 219/121.6, 121.61, 219/121.62, 121.63, 121.64, 121.65, 121.66, 121.83, 121.85

(56) References Cited

U.S. PATENT DOCUMENTS 5,665,255 A * 9/1997 Busuttil .................. 219/121.63

FOREIGN PATENT DOCUMENTS

JP 363140788 A * 6/1988 ............ 219/121.63

* cited by examiner

Primary Examiner—Samuel M. Heinrich
(74) Attorney, Agent, or Firm—Wenderoth, Lind & Ponack, L.L.P.

(57) ABSTRACT

The present invention is to provide a novel laser welding method, capable of preventing formation of a welding defect, and achieving a deep penetration by a low heat input so as to enable formation of a welding structure with a high strength and a high toughness even in the case of welding by a high power laser. A welding operation is executed with a periodical fluctuation adjustment so as to have a base output of 50% or more with respect to a peak output.

15 Claims, 4 Drawing Sheets

|10mm|

(A) X ray radiographic examination of a welded part, using the present invention ($W_B = 0.6 W_P$)

(B) X ray radiographic examination of a welded part by a continuous wave beam with an average output same as that of (A)

LASER WELDING METHOD

BACKGROUND OF THE INVENTION

1. Filed of the Invention

The present invention relates to a laser welding method. More specifically, it relates to a novel laser welding method, capable of preventing formation of a welding defect, and achieving a deep penetration by a low heat input so as to enable formation of a welding structure with a high strength and a high toughness even in the case of a high power laser welding.

2. Description of the Related Art

Recently, a higher output of laser oscillators has been promoted dramatically, and application thereof for the deep penetration and the high speed welding is expected. However, for example, as described in FIG. 1, with a deeper penetration, it gets difficult to stably maintain a keyhole. Thereby, defects such as the porosity, the blowhole, and cracking can easily be formed.

This has been a serious problem to establish a high quality welding with a high power $CO_2$ laser.

Although methods for preventing porosity, cracking or spatter in a welded part have been discussed so far as a welding method using an YAG laser, the discussion has been held so far for welding of a thin plate, and thus a method for stably maintaining a keyhole in welding with a high power laser for a deep penetration, capable of effectively preventing formation of defects such as the porosity, the blowhole, and cracking has not been provided so far.

SUMMARY OF THE INVENTION

Accordingly, in order to solve the above-mentioned conventional problems, an object of the present invention is to provide a novel laser welding method, capable of preventing formation of a welding defect, and achieving a deep penetration by a low heat input so as to enable formation of a welding structure with a high strength and a high toughness even in the case of a high power laser welding.

In order to solve the above-mentioned problems, a first aspect of the present invention is a laser welding method for welding with a periodical fluctuation adjustment so as to have a base output of 50% or more with respect to a peak output.

Moreover, a second aspect of the present invention is a laser welding method, with a base output of 50 to 70% with respect to a peak output. A third aspect of the present invention is a laser welding method for applying a periodical fluctuation of 200 Hz or less to the output. A fourth aspect of the present invention is a laser welding method with a 10 mm or more penetration depth.

Furthermore, a fifth aspect of the present invention is a method of using a $CO_2$ laser in any of the above-mentioned methods, and a sixth aspect of the present invention is a method of using a high power $CO_2$ laser of 5 KW or more.

BRIEF DESCRIPTION OF THE DRAWINGS

FIG. 2A is a result of the X ray radiographic examination of a welded part, using the present invention; and FIG. 2B is a result of the X ray flaw detection test of a welded part by a continuous wave beam with an average output same as that of FIG. 2A.

DESCRIPTION OF THE PREFERRED EMBODIMENT

The present invention with the above-mentioned features has been completed based on the knowledge obtained by the present inventor as follows.

That is, conventionally, in welding with a high output power $CO_2$ laser, it is not easy to optionally fluctuate the output at a high speed, and thus the welding operation has been executed mainly by the continuous wave. Therefore, particularly in the case of a partial penetration welding with a deep penetration, it is difficult to maintain a keyhole stable according to increase of the penetration depth so that defects such as the porosity, the blowhole, and cracking are formed thereby, and thus it has been extremely difficult to execute a high quality welding without a defect.

Then, by the elaborate discussion of the present inventor, it was learned that formation of a welding defect can be prevented effectively by controlling the laser output power from the outside and applying a specific periodical fluctuation to the laser output so as to enable a deep penetration.

The specific periodical fluctuation is a fluctuation adjustment so as to have a base output of 50% or more with respect to a peak output. More preferably, the base output at the time is 50 to 70% with respect to a peak output. In either case, the base output cannot be zero.

In the present invention, it is further preferable that the output periodical fluctuation is 200 Hz or less.

As the laser light source, in the present invention, a $CO_2$ laser, in particular, a high power $CO_2$ laser is conceivable. However, the periodical fluctuation adjustment with the above-mentioned features can be adopted effectively for a deep penetration welding also in the case of other laser methods.

As a further specific embodiment of the laser welding of the present invention, by applying a periodical output fluctuation so as to have a base output of 50% or more with respect to a peak output in a low frequency range of 200 Hz or less, using a high output $CO_2$ laser, generation of drastic spatter can be prevented in a deep penetration welding by 10 mm or more so as to effectively prevent formation of welding defects such as the porosity, the blowhole, and cracking.

Hereinafter, the present invention will be explained in further detail with reference to an embodiment, but the present invention is not limited to the following embodiment.

[Embodiment]

Using JIS SM490 type steel for the general welding structure, a partial penetration welding was executed with a bead on plate. With a maximum laser output of 20 kW, an He gas was supplied by 50 L/min to shield the weld with a side shield method.

Figure 1:
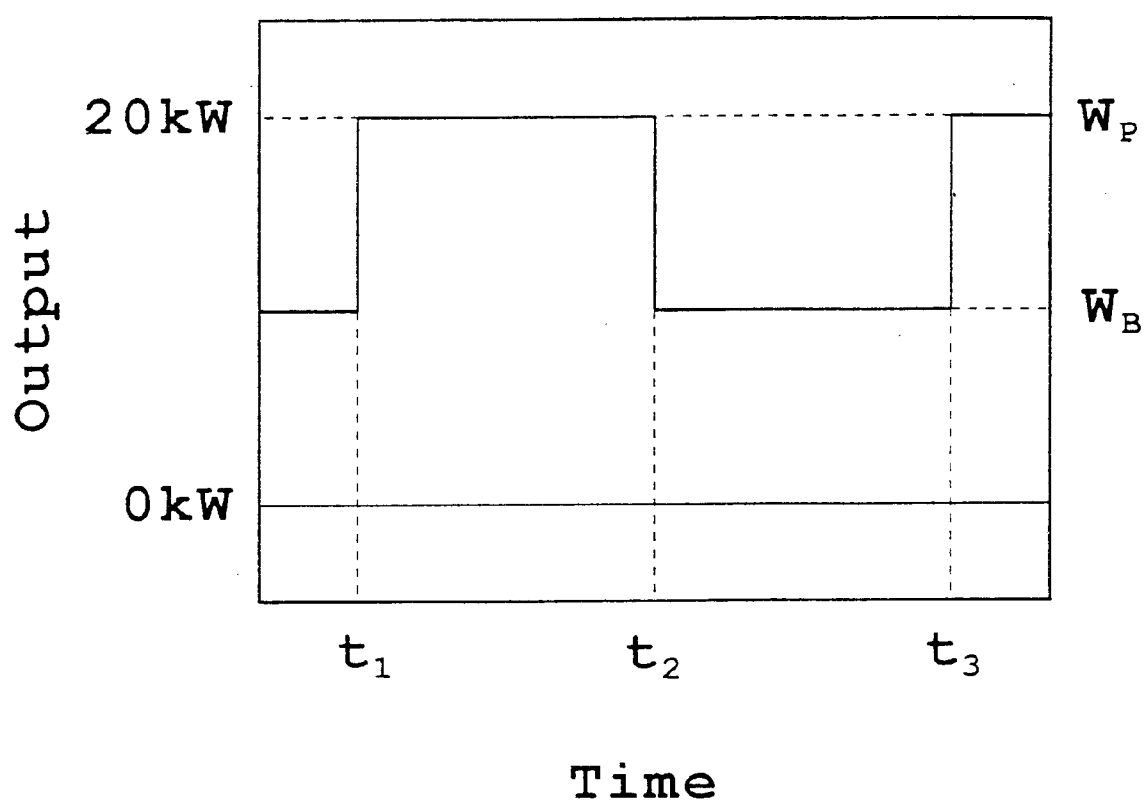
FIG. 1 is a diagram showing an output wave form used in an embodiment.

FIG. 1 shows a pulse laser output wave form. The lateral axis represents time, and the vertical axis represents the output power of the pulse laser. As shown in FIG. 1, the pulse wave form was superimposed such that the maximum output (peak output) becomes $W_P$ on the base output $W_B$. The pulse frequency was 15 Hz, the duty was 50%, and the base output and peak output ratio ($W_B/W_P$) was changed in the range of 40 to 90%. The periodical output fluctuation was carried out by controlling the discharge current from the outside. The average output at the time was calculated by the following formula, and the defect amount was compared with the case of the continuous wave welding with the same output.

$$\text{Average output} = ((t_2-t_1) \times W_P + (t_3-t_2) \times W_B))/(t_3-t_1)$$

The welding operation of this embodiment is for a deep penetration of about 20 mm. It was observed that drastic spatter is generated by the contact of a laser with a molten metal oscillating according to the output fluctuation, with 40% or less ($W_B/W_P$). Moreover, since the molten metal amount becomes insufficient according to generating the spatter, the under fill is formed on the bead surface. In contrast, with 70% or more ($W_B/W_P$), the laser output fluctuation effect becomes small so that formation of the porosity and the blowhole was observed similar to the case of the continuous wave welding.

Figure 2:
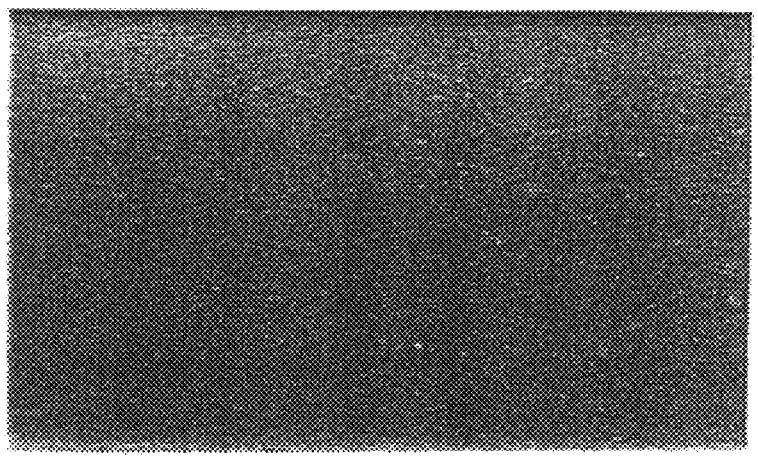
FIGS. 2A and 2B are photographs of results of an X ray radiographic examination ($W_B$=0.6 $W_P$), showing the defect generation state of the embodiment.
Figure 2:
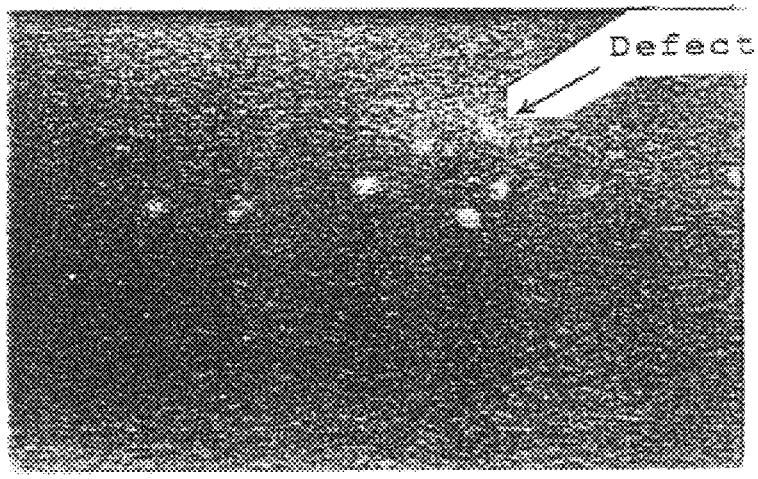
Figure 3:
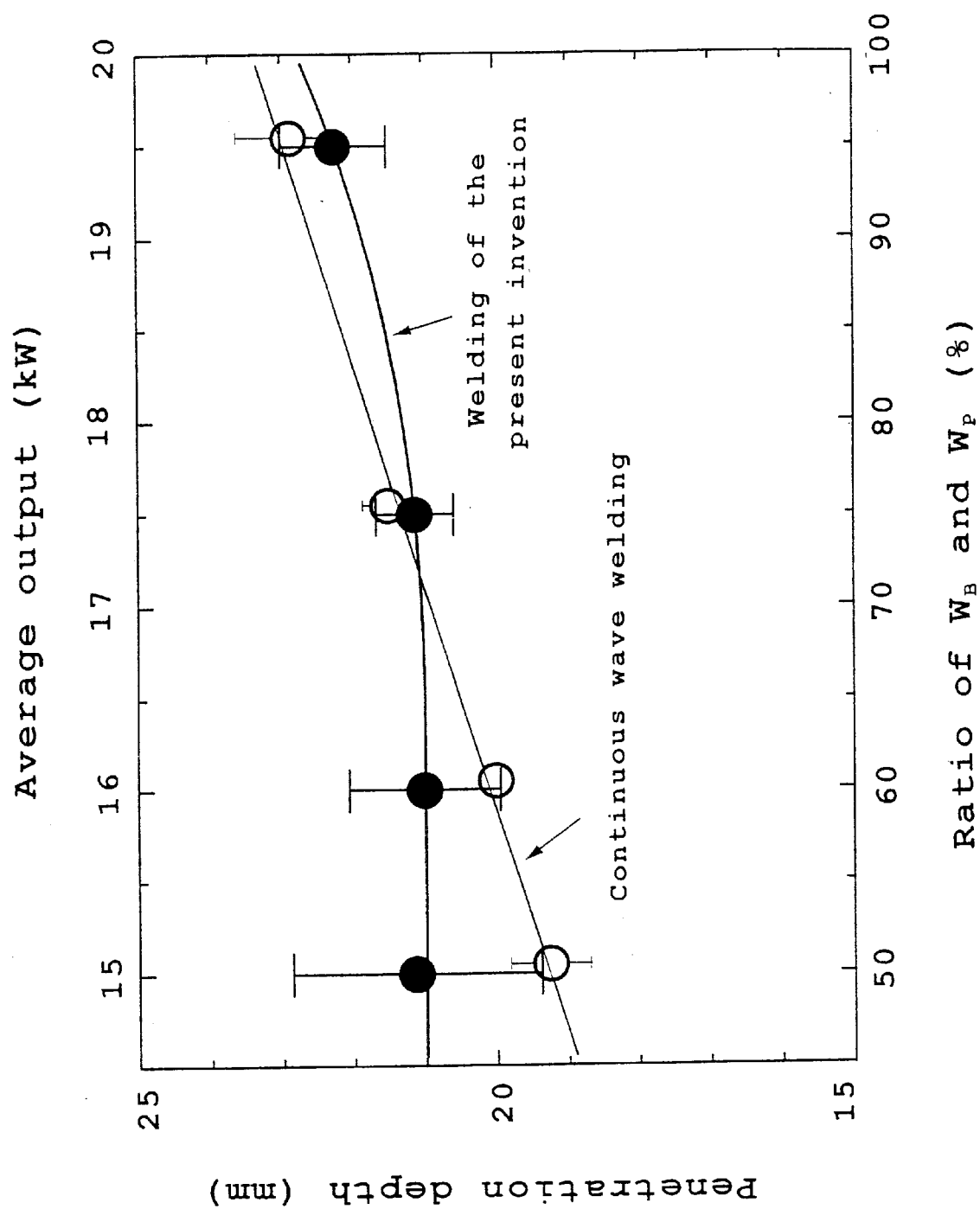
FIG. 3 is a graph showing the penetration depth of the embodiment, wherein ● denotes the case with the output control of the present invention, and ○ denotes the case with the continuous wave welding.
Figure 4:
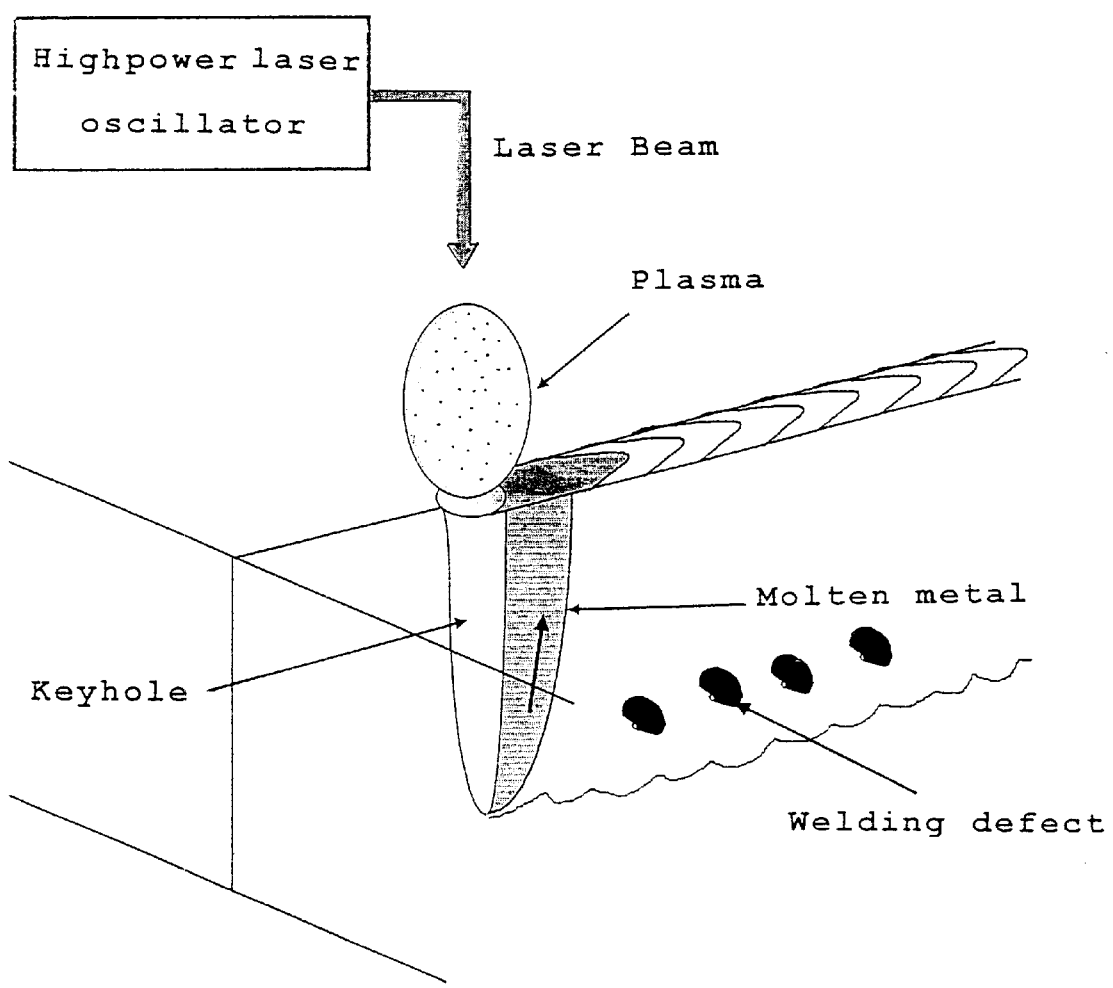
FIG. 4 is a schematic diagram describing the welding defect generation.

In contract, with the ($W_B/W_P$) in a 50 to 60% range, as shown in FIGS. 2A and 2B, formation of the porosity and the blowhole was effectively prevented while suppressing generation of the drastic spatter. FIG. 3 shows the penetration depth at the time. In the condition with the defect effectively prevented, since the base output is 50 to 60% with respect to the peak output, decrease of the penetration depth can be restrained to 10% or less compared with the case of the 20 kW continuous wave welding.

From the above-mentioned, it was learned that formation of the porosity, and the blowhole can be prevented effectively with little spatter generation while maintaining a deep penetration depth by the use of the method of the present invention.

As heretofore explained in detail, according to the present invention, a novel laser welding method, capable of preventing formation of a welding defect, and achieving a deep penetration by a low heat input so as to enable formation of a welding structure with a high strength and a high toughness even in the case of welding by a high power laser, can be provided.

What is claimed is:

1. A laser welding method for welding with a periodical fluctuation adjustment so as to have a base output of 50% or more with respect to a peak output.

2. The laser welding method according to claim 1, wherein the base output is 50 to 70% with respect to the peak output.

3. The laser welding method according to claim 1, wherein the output fluctuation frequency is 200 Hz or less to the output.

4. The laser welding method according to claim 1, wherein the penetration depth is 10 mm or more.

5. The laser welding method according to claim 1, wherein a $CO_2$ laser is used.

6. The laser welding method according to claim 5, wherein a high output $CO_2$ laser of 5 KW or more is used.

7. The laser welding method according to claim 2, wherein the output fluctuation frequency is 200 Hz or less to the output.

8. The laser welding method according to claim 2, wherein the penetration depth is 10 mm or more.

9. The laser welding method according to claim 3, wherein the penetration depth is 10 mm or more.

10. The laser welding according to claim 2, wherein a $CO_2$ laser is used.

11. The laser welding method according to claim 3, wherein a $CO_2$ laser is used.

12. The laser welding method according to claim 4, wherein a $CO_2$ laser is used.

13. The laser welding method according to claim 10, wherein a high output $CO_2$ laser of 5 KW or more is used.

14. The laser welding method according to claim 11, wherein a high output $CO_2$ laser of 5 KW or more is used.

15. The laser welding method according to claim 12, wherein a high output $CO_2$ laser of 5 KW or more is used.

* * * * *